(12) United States Patent
Russell et al.

(10) Patent No.: US 7,219,210 B2
(45) Date of Patent: May 15, 2007

(54) MEMORY ALLOCATION TO MULTIPLE COMPUTING UNITS

(75) Inventors: Paul F. Russell, Queanbeyan (AU); Paul Mackerras, Weston (AU)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 10/812,773

(22) Filed: Mar. 30, 2004

(65) Prior Publication Data

US 2005/0223184 A1    Oct. 6, 2005

(51) Int. Cl.
*G06F 12/10* (2006.01)

(52) U.S. Cl. ............... 711/202; 711/203; 711/170; 713/1

(58) Field of Classification Search ............ None
See application file for complete search history.

(56) References Cited

U.S. PATENT DOCUMENTS

| | | | |
|---|---|---|---|
| 5,652,853 A | 7/1997 | Duvalsaint et al. | |
| 5,822,601 A | 10/1998 | DeRoo et al. | |
| 6,308,248 B1 | 10/2001 | Welker et al. | |
| 6,453,403 B1 | 9/2002 | Czajkowski | |
| 6,453,404 B1 | 9/2002 | Bereznyi et al. | |
| 6,499,095 B1* | 12/2002 | Sexton et al. | 711/203 |
| 6,886,031 B2* | 4/2005 | Venkatsubramanian et al. | 709/213 |
| 2001/0013090 A1* | 8/2001 | Sandstrom | 711/147 |
| 2002/0133678 A1* | 9/2002 | Mathews et al. | 711/153 |
| 2005/0132250 A1* | 6/2005 | Hansen et al. | 714/5 |

* cited by examiner

*Primary Examiner*—Hyung Sough
*Assistant Examiner*—Jasmine Song
(74) *Attorney, Agent, or Firm*—Abdy Raissinia

(57) ABSTRACT

Memory allocation to multiple computing units is disclosed. A static offset for each computing unit is determined, and a portion of memory is allocated for each computing unit, and remapped into a contiguous logical region that is addressable by a pointer plus the static offset. The portion of the memory is dynamically passed out to each computing unit as the computing units need memory. Upon the initial contiguous memory being completely passed out to the computing units, a number of physically non-contiguous sections of memory are mapped into another logically contiguous section of memory. A portion of this logically contiguous section of memory is allocated for each computing unit, and is addressable by a pointer plus the static offset that was previously determined. The portion of the logically contiguous section of memory can be dynamically passed out to each computing unit as the computing units need memory.

17 Claims, 4 Drawing Sheets

MEMORY ALLOCATION TO MULTIPLE COMPUTING UNITS

FIELD OF THE INVENTION

This invention relates generally to memory allocation, and more specifically to memory allocation to multiple computing units, such as multiple computing nodes and/or multiple processors.

BACKGROUND OF THE INVENTION

Within a typical single-processor computing environment, memory is dynamically allocated as it is needed by the processor. That is, when the processor needs memory for whatever reason, it can request and receive an allocation of memory in the amount that is desired. Memory allocation within multiple-processor computing environments is, however, more difficult. Memory may be shared by all the processors, and specific portions of the memory may be local to one of the processors but remote to the other processors. Therefore, it is desirable to allocate duplicates of memory, or one memory location for each processor, rather than having all the processors share the same allocation of memory. It is noted that local memory is accessed more quickly than remote memory. The local memory of a given processor is remote memory to the other processors.

One approach to allocating memory within a multiple-processor computing environment is to allocate a large section of local memory for each processor at boot time, and then dynamically pass out the memory as needed. For static allocations, the simplest technique is to group all per-processor variables together, and then allocate a copy of that group for each processor at boot time within memory that is local to the processor. Each processor needs only maintain a single offset to locate its copy of a given variable within its local memory.

For example, if there are five kilobytes of static per-processor data, the system may choose to allocate five kilobytes of memory per processor at boot time using standard dynamic allocation techniques, by allocating memory for each processor that is within the range of memory closest to that processor—in other words, local memory to each processor. Each processor then stores an offset between the static area and the allocated per-processor data, so that the processor can find its copy of the static area within its own local memory with a simple offset from the static area.

Such an addressing scheme, however, can be problematic after boot time, once all of the initially allocated memory has been passed out to the processors. This is because additional allocations of memory may be difficult to accomplish for the same addressing scheme of a general pointer plus an offset specific to each processor to be employed. For instance, available memory may be fragmented or otherwise limited, such that reproducing the exact same layout between allocations for each processor is at best difficult, and more than likely impossible.

This problem can be solved by allocating memory for all the processors from a single contiguous section of memory, so that the same pointer plus per-processor offset can be used. However, the memory allocated to each processor is no longer local to the processor by which it is used. To allocate memory to each processor that is local to each processor, more complicated and complex addressing schemes may have to be used, which can add undesired overhead and difficulty to the memory allocation process. A common solution is to generate a new table of offsets for each processor with each allocation, which is wasteful and requires an extra memory load to de-reference every different per-processor pointer.

SUMMARY OF THE INVENTION

A method of the invention maps a number of physically non-contiguous sections of memory into a logically contiguous section of memory. For each of a number of computing units, such as processors within the same computing node, or different computing nodes, a portion of the logically contiguous section of memory that is addressable by a pointer plus a static offset corresponding to the computing unit is allocated. The static offset for each computing unit is equal to the static offset initially determined and used at initial allocation of memory for the computing units.

Another method of the invention determines a static offset for each computing unit, and allocates for each computing unit a portion of a logically contiguous section of memory addressable by a pointer plus the static offset corresponding to the computing unit. The portion of logically contiguous section of memory is then dynamically passed out to each computing unit as the computing units need additional memory. Upon the logically contiguous section of memory being completely used by the computing units, a number of physically non-contiguous sections of memory are mapped into another logically contiguous section of memory. A portion of this logically contiguous section of memory is allocated for each computing unit, and is addressable by a pointer plus the static offset corresponding to the computing unit that was previously determined. The portion of the logically contiguous section of memory can then be dynamically passed out to each computing unit as the computing units need additional memory.

A system of the invention includes a number of computing nodes, memory shared by the computing nodes, and an allocating mechanism within at least one of the computing nodes. The allocating mechanism maps physically non-contiguous sections of memory into a logically contiguous section of memory, and allocates a portion of this section of memory to each computing node. The portion of the logically contiguous section of memory is addressable by a pointer plus a static offset corresponding to the computing node, and equal to a static offset initially determined for allocating memory to each computing node.

A computing node of the invention includes a number of processors, memory shared by the processors, and an allocating mechanism. The allocating mechanism maps physically non-contiguous sections of memory into a logically contiguous section of memory, and allocates a portion of this section of memory to each processor. The portion of the logically contiguous section of memory is addressable by a pointer plus a static offset corresponding to the processor and equal to a static offset initially determined for allocating a portion of memory to each processor.

An article of manufacture of the invention includes a computer-readable medium and means in the medium. The means is for mapping physically non-contiguous sections of memory into a logically contiguous section of memory, and for allocating a portion of this section of memory to each of a number of computing units. The portion of the logically contiguous section of memory is addressable by a pointer plus a static offset corresponding to the computing unit and equal to a static offset initially determined for allocating a portion of memory to each computing unit.

Embodiments of the invention provide for advantages over the prior art. Using a single logically contiguous allocation solves the common situation where memory sections of the same layout as the initial allocations are unavailable. Optimal memory allocation, where the memory for each processor is within the range of memory near to that processor, is still nevertheless accomplished due to the mapping of different non-contiguous physical memory sections into a single logically contiguous section of memory. Furthermore, the same static offset originally used during allocation of memory can be employed later during allocation of logically contiguous memory, rendering the access of allocated memory more convenient for the computing units. Further advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Method

Figure 1:
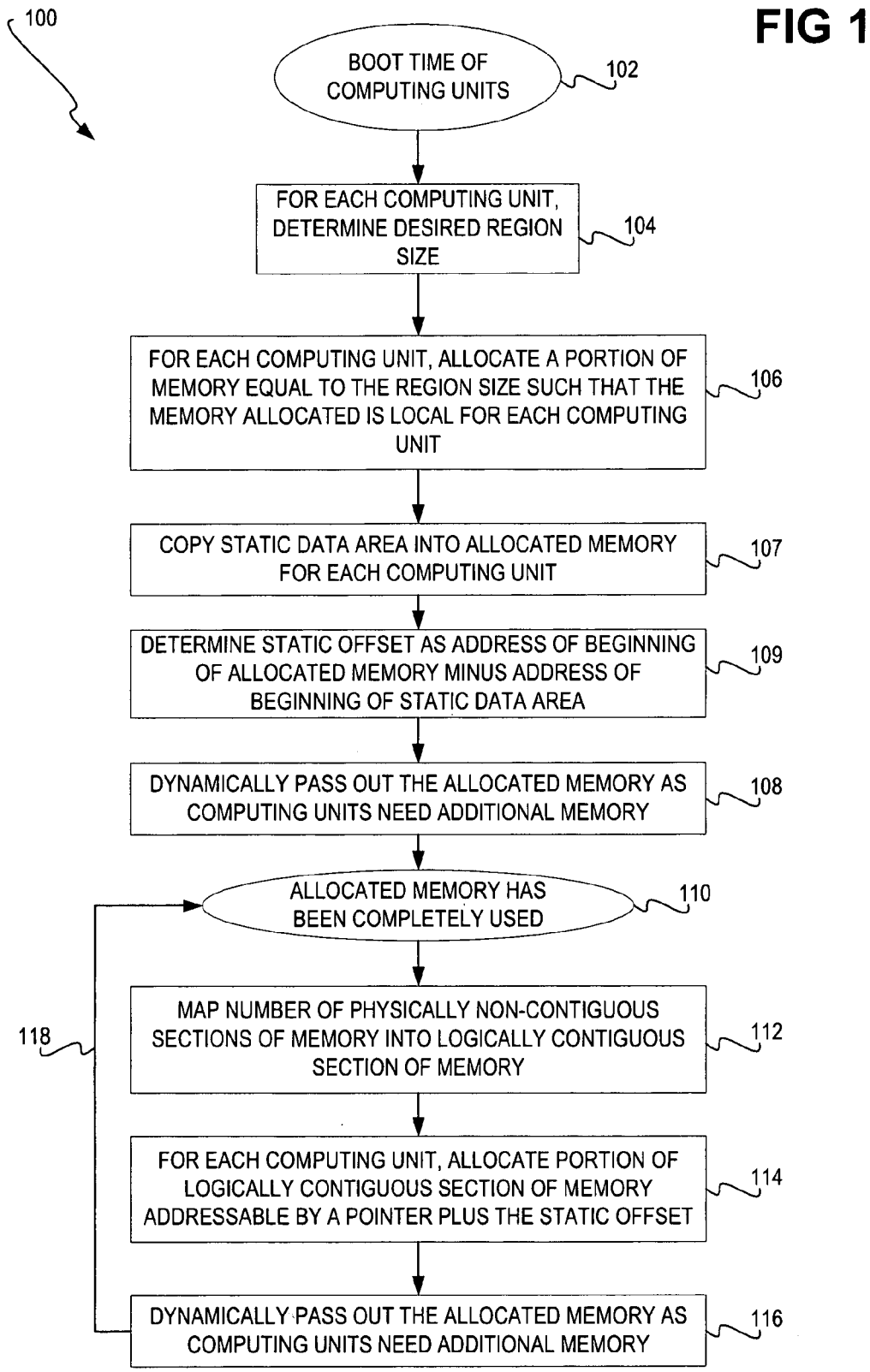
FIG. 1 is a flowchart of a method for allocating memory, according to an embodiment of the invention.

FIG. 1 shows a method 100 for allocating memory to a number of computing units, according to an embodiment of the invention. The computing units may be different processors of a single computing node, such as a computer, or may be different computing nodes of a multiple-node system, each having one or more processors. The computing units share memory. In the case of a single computing node embodiment, the processors of the node may share memory that is part of the node. In the case of a multiple-nodes environment, the processors of the nodes may share memory that is part of one or more of the nodes. As such, the method 100 may be implemented within a non-uniform memory architecture (NUMA), where the memory of a given node is local to that node, and remote to other nodes of the system. The method 100 may also be implemented within other types of memory architectures, such as uniform memory architectures. Furthermore, the method 100 may be implemented as a means within a computer-readable medium of an article of manufacture in one embodiment of the invention.

At boot time of the computing units (102), the memory shared by the computing units is substantially unused, such that large sections of contiguous memory may be available for allocation. Boot time of the computing units is one example of an initial allocation of memory for the computing units. Contiguous memory can be defined as memory that is addressable by a series of consecutive addresses. In general, two adjacent addresses may reference memory that is located on the same memory integrated circuit (IC), or "chip." In another case, two adjacent addresses may reference memory that is located on adjacent memory IC's, such that one address references the last memory location on one memory IC and another address references the first memory location on the next memory IC. In a third case, two adjacent addresses may reference memory that is located on memory IC's of adjacent computing units, such that one address references the last memory location on the last memory IC of one computing unit and another address references the first memory location on the first memory IC of the next computing unit.

Figure 2A:
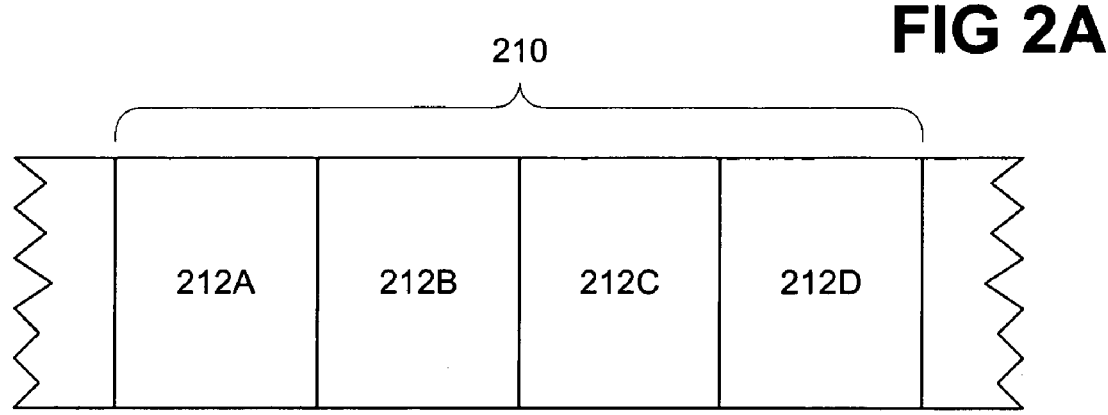
FIGS. 2A–2C are diagrams illustratively depicting exemplary performance of the method of FIG. 1, according to an embodiment of the invention.

Referring back to FIG. 1, for each computing unit, a desired region size of memory to be allocated is determined (104). For instance, it may be determined that each computing unit needs five kilobytes of memory. Next, for each computing unit, a portion of memory is allocated, where the portion of memory for each unit is equal in size to the desired region size and is local to the computing unit (106). As part of 104, a number of physically non-contiguous regions of memory may be mapped into a logically continuous region of memory. Explanation of 104 and 106 is particularly provided with reference to FIG. 2A, which shows an example of a logically contiguous section of memory 210, according to an embodiment of the invention. The contiguous memory 210 is allocated over four different computing units, and thus is divided into portions 212A, 212B, 212C, and 212D, collectively referred to as the contiguous memory portions 212. The portion of memory 212A is local to a first computing unit, the portion of memory 212B is local to a second computing unit, the portion of memory 212C is local to a third computing unit, and the portion of memory 212D is local to a fourth computing unit.

Referring back to FIG. 1, a static data area is copied into each portion of the allocated memory, for each computing unit (107). For instance, the static data area may hold variables that need to be used by all of the computing units, where each of the computing units is to maintain its own copy of the variables after their original values have been set. Such static data may be referred to as per-processor data, and is copied from a given address within the memory to each portion of the allocated memory. Next, the static offset for each computing unit is determined as the beginning of the portion of allocated memory for that computing unit computing minus the address of the beginning of the static data area (109). For example, four computing units may have had memory allocated to them beginning at addresses 100,000, 200,000, 300,000, and 400,000, where the portion of memory allocated to each computing unit is local to that computing unit. These may then mapped to the logical addresses 500,000, 505,000, 510,000 and 515,000 in one embodiment of the present invention. Where the static per-processor data was copied from a static data area beginning at logical address 10,000, this results in static offsets of 490,000, 495,000, 500,000 and 505,000, respectively, for the four computing units.

Thus, the allocated memory portion for each computing unit is addressable by a dynamic pointer within the static data area, which is common to all the computing units, plus a static offset particular to a given computing unit. The pointer is general to all of the allocated memory portions, and therefore to all of the computing units to which the portions have been allocated, whereas the static offset is particular to a given of the allocated portions, and therefore to a given of the computing units to which the portions have been allocated. In other words, the pointer is dynamic, and varies to reference different memory locations within a given of the allocated memory portions, but is the same for all of the allocated memory portions, whereas the offset is static, and does not change or vary, but is different for each of the allocated memory portions.

The static offset for each computing unit is determined in 109 such that the lowest value of the pointer plus the static offset addresses the first memory location within the portion of the logically contiguous memory section to be allocated to that computing unit, and such that the highest value of the pointer plus the static offset addresses the last memory location within that memory portion. The portions of the logically contiguous section of memory are dynamically passed out to their respective computing units as the computing units need additional memory (108) to perform the tasks, processes, and so on, that have been asked of them. Such passing out of a portion of the logically contiguous section of memory to a corresponding computing unit can be considered to be local dynamic memory allocation, in that the computing unit is dynamically allocating the memory previously allocated, or reserved, for it in 106, to its constituent processes and data storage needs. The portion of the logically contiguous section of memory allocated to each computing unit in 106 is desirably sufficiently large that the dynamic passing out process in 108 can be performed many times until all of the memory locations within the portion has been used.

However, at some point, all of the memory locations within the portions of the logically contiguous section of memory allocated to one or more of the computing units will have been completely used (110). That is, at least one of the computing units will have completely passed out all memory locations within the portion of the logically contiguous section of memory allocated to it, such that additional memory has to be allocated for the computing units, by performing 112, 114, and 116. In one embodiment, 112, 114, and 116 are performed as soon as one of the computing units has completely used its allocated portion of memory, whereas in another embodiment, 112, 114, and 116 are not performed until all of the computing units have completely used their allocated portions of memory.

Figure 2B:
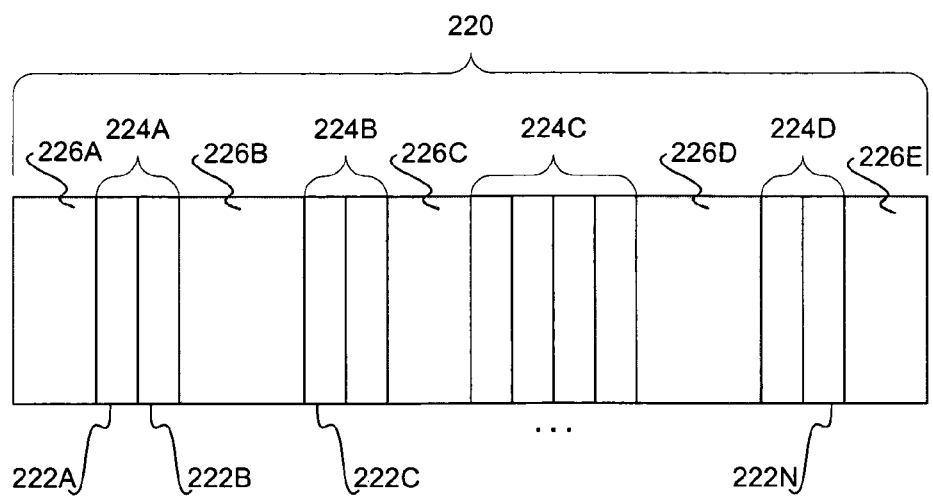

By the time additional memory needs to be allocated to one or more computing units, however, the existing allocated total memory shared by all the computing units is likely to have been already significantly allocated, such that few if any large contiguous sections of memory remain for allocation consistent with 104, 106, 107, 109, and 108. FIG. 2B shows an example of memory 220 according to an embodiment of the invention. The memory 220 includes currently in use memory sections 226A, 226B, 226C, 226D, and 226E, collectively referred to as the currently in use memory sections 226, and which are shaded in FIG. 2B for illustrative clarity. The memory 220 also includes available memory sections 224A, 224B, 224C, and 224E, collectively referred to as the available memory sections 224, and which are not shaded in FIG. 2B for illustrative clarity.

The available memory sections 224 are physically non-contiguous with one another, and are available in the sense that they are not currently being used, and therefore are ready for allocation. Collectively, the memory sections 224 may represent a sufficiently large section of memory that can be allocated to the computing units. However, individually, each of the available memory sections 224 may be too small for desired allocation to the computing units. That is, the presence of the currently in used memory sections 226B, 226C, and 226D located among the available memory sections 224 prevents any of the memory sections 224 from being contiguously large enough for adequate allocation to the computing units consistent with 104, 106, 107, 109, and 108 of the method 100 of FIG. 1.

The memory sections 224 encompass memory locations 222A, 222B, 222C, 222N, collectively referred to as the memory locations 222. Whereas the memory locations 202 of FIG. 2A may be contiguous to one another such that it can be guaranteed that a given memory location has a memory address that is consecutive to the next memory location, the memory locations 222 of FIG. 2B are not so contiguous. That is, while some of the memory locations 222 may have memory addresses that are consecutive to the memory addresses of next available memory locations, other of the memory locations 222 do not have such consecutive memory addresses. For example, whereas the memory location 222B may have a memory address that is consecutive with the memory address of the memory location 222A, its memory address is not consecutive with the memory address of the memory location 222C. This means that the memory sections 224 cannot be allocated in a way in which they are addressable by a common pointer to the computing units plus a static offset particular to a given computing unit in the way that has been described in relation to 104, 106, 107, 109, and 108 of the method 100 of FIG. 1.

Figure 2C:
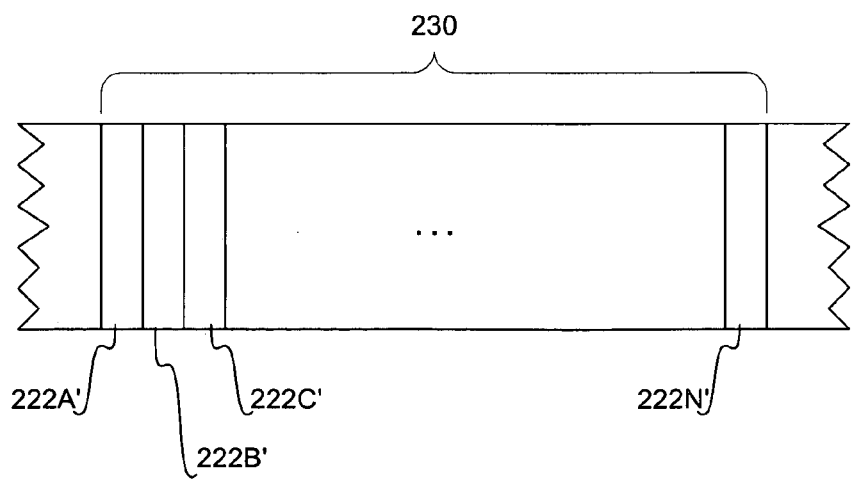

Referring back to FIG. 1, then, the number of physically non-contiguous sections of memory are therefore again mapped into a single logically contiguous section of memory (112). Mapping the physically non-contiguous sections with logically consecutive memory addresses defines a single logically contiguous section of memory. FIG. 2C shows an example of a single logically contiguous section of memory 230, according to an embodiment of the invention. The logically contiguous memory section 230 has logical memory locations 222A', 222B', 222C', . . . , 222N', collectively referred to as the logical memory locations 222'. The logical memory locations 222' are mapped to the memory locations 222 of FIG. 2B, such that the memory addresses of the logical memory locations 222' are consecutive with one another, even though the memory addresses of the memory locations 222 are not.

For example, for exemplary purposes only, the memory addresses of the memory locations 222 of FIG. 2B may be 500 for location 222A, 501 for location 222B, 515 for location 222C, and so on. By comparison, the logical memory addresses of the logical memory locations 222' of FIG. 2C may be 600 for location 222A', 601 for location 222B', 602 for location 222C', and so on. Whereas the memory address for the memory location 222C is not consecutive to the memory address for the memory location 222B, the logical memory address for the memory location 222C' is consecutive to the logical memory address for the memory location 222B'. Remapping the memory addresses of the physically non-contiguous sections of memory 224 of FIG. 2B enables a contiguous section of memory 230, albeit in a logic sense, to be defined.

Therefore, the memory allocation process that has been described can be employed again, but the address is manipulated in such a way that the addition of the static offset causes the allocated memory to be accessed. For example, if the logical addresses in 112 were 600,000–619,999 inclusive (following the previously recited example of five kilobytes and four processors), the address would become 600,000 minus 490,000, which is the static offset of the first processor, or 110,000. The result is that the first processor would add its offset of 490,000 to the address, or pointer, of 110,000 to access the memory at 600,000 as has been allocated, the second processor would add its offset of 495,000 to the address, or pointer, of 110,000 to access the memory at 605,000, and so on. Referring back to FIG. 1, then, for each computing unit, a portion of the logically contiguous section of memory is allocated, addressable by a pointer plus the static offset (114).

The way the pointer and the static offset is used to address the portion of the logically contiguous memory section allocated to a given computing unit in 114 is the same as it is used to address the portion of the logically contiguous memory section allocated to the computing unit in 106, and is not repeated to avoid redundancy. Furthermore, it is noted that the portions of the logically contiguous section of memory allocated to the computing units in 114 are preferably local to the computing units. That is, each computing unit receives a portion of the logically contiguous section of memory that represents memory that is preferably, but not necessarily, local to the computing unit. That is, logically remapping non-contiguous sections of memory as a logically contiguous section of memory allows for each computing unit to preferably receive memory that is local to the computing unit.

The computing units are thus again able to dynamically pass out the portions of the logically contiguous section of memory allocated to them to their constituent tasks, processes, and so on, as before (116). At some point, again, however, the portion of the logically contiguous section of memory allocated to one or more of the computing units will have been completely passed out, or used, as indicated by the arrow 118 pointing to 110. Therefore, the method 100 repeats 112 and 114 to map another set of physically non-contiguous sections of memory into a single logically contiguous section of memory, which can then be allocated to the computing units as has been described. The memory allocation process, by performance of the method 100 of FIG. 1, is thus made more convenient and easier for the computing units, in that the manner by which they receive allocated memory does not substantially change between the initial allocation of memory for static data in 106, and later allocations of dynamic data memory in 114. The utilization of the same static offset for a given computing unit in 114 when allocating logical memory as that used in 106 when allocating initial memory allows for this added convenience and ease of use.

Furthermore, the utilization of the same static offset for a given computing unit in 114 when allocating logical memory as that used in 106 when allocating initial memory avoids having to employ complicated and complex addressing schemes. As a result, embodiments of the invention avoid the undesired overhead and difficulty that such addressing schemes usually add to the memory allocation process. For instance, embodiments of the invention avoid having to generate a new table of offsets for each processor with each allocation, as in the prior art, which is wasteful and requires an extra memory load to de-reference every different per-processor pointer.

Systems

Figure 3A:
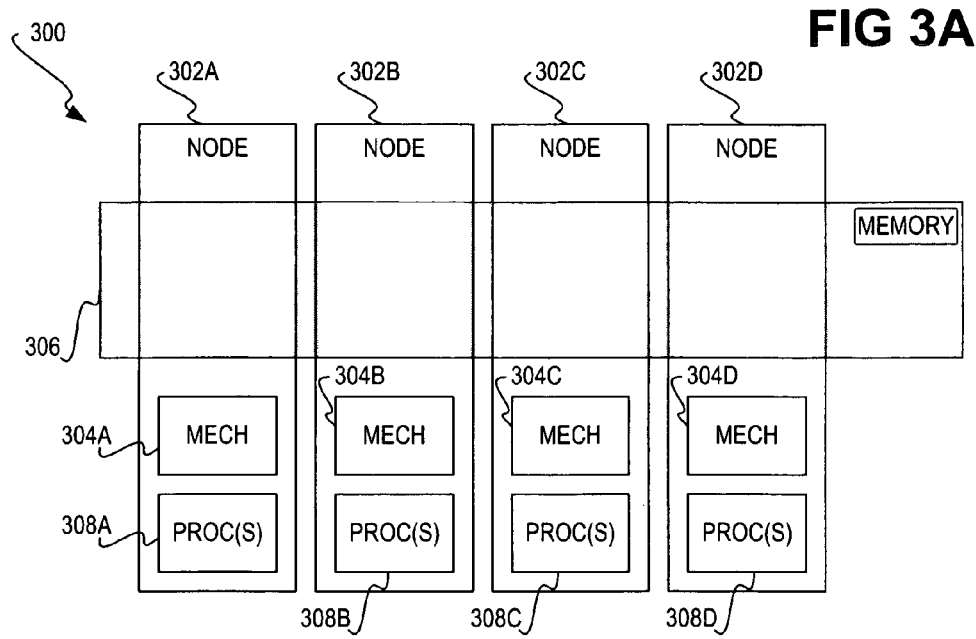
FIGS. 3A and 3B are diagrams of systems, according to differing embodiments of the invention.
Figure 3B:
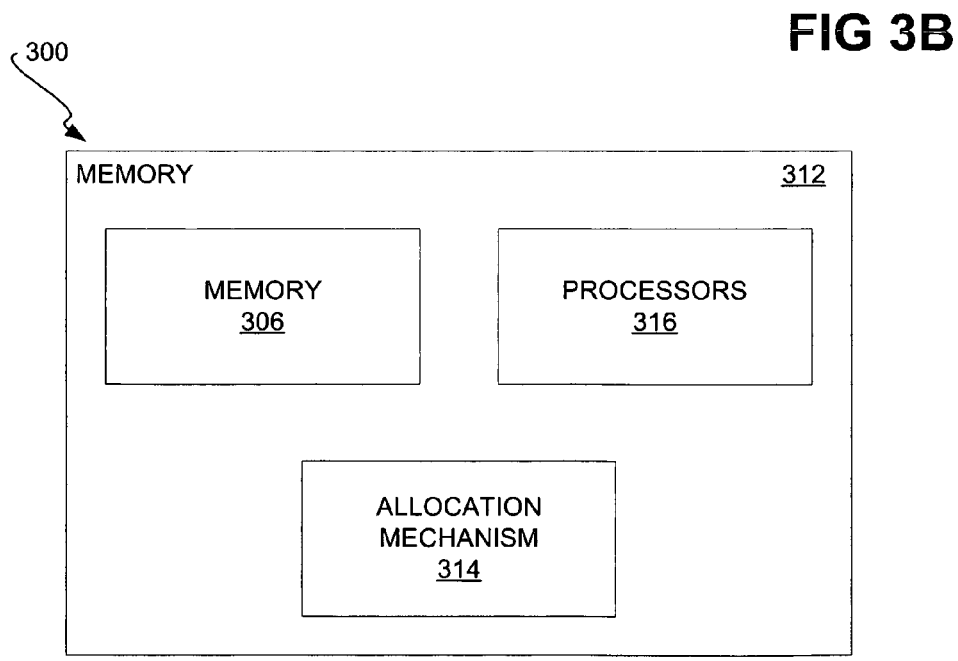

FIGS. 3A and 3B show a system 300 in conjunction with which the memory allocation process that has been described may be implemented, according to varying embodiments of the invention. Referring first to FIG. 3A, the system 300 is made up of computing nodes 302A, 302B, 302C, and 302D, collectively referred to as the nodes 302. Each of the nodes 302 may include components in addition to and/or in lieu of those depicted in FIG. 3A. There may further be more or less than the four nodes 302 depicted in FIG. 3. As depicted in FIG. 3A, the nodes 302A, 302B, 302C, and 302D include one or more processors 308A, 308B, 308C, and 308D, respectively, which are collectively referred to as the processors 308.

Memory 306 is shared among all the nodes 302. The memory 306 may reside external to all the nodes 302, or may reside internal to one of the nodes 302. Furthermore, a part of the memory 306 may reside within each of the nodes 302, such that a non-uniform memory architecture (NUMA) is achieved where each of the nodes 302 has memory that is local to it and that is remote to all the other of the nodes 302. The nodes 302A, 302B, 302C, and 302D have allocation mechanisms 304A, 304B, 304C, and 304D, collectively referred to as the mechanisms 304, to map physically non-contiguous sections of the memory 306 into a logically contiguous section of memory, to allocate a portion of the logically contiguous section of memory to each of the nodes 302, and otherwise to perform the memory allocation process that has been described. The mechanisms 304 may be implemented in hardware, software, or as a combination of both hardware and software.

Furthermore, whereas in the embodiment of FIG. 3A each of the computing nodes 302 has a corresponding one of the allocation mechanisms 304, alternatively a single allocation mechanism may be implemented in a distributed fashion over two or more of the nodes 302. Additionally, a single allocation mechanism may be present, but it may be implemented within just one of the nodes 302. In another embodiment, a single allocation mechanism may be present but implemented external to all of the nodes 302.

Referring next to FIG. 3B, the system 300 is made up of a single computing node 312, which like the nodes 302, may include components in addition to and/or in lieu of those depicted in FIG. 3B, and which includes a number of processors 316 as well as the memory 306. The node 312 includes a memory allocation mechanism 314 comparable to the mechanisms 304. That is, the mechanism 314 is able to map physically non-contiguous sections of the memory 306 into a logically contiguous section of memory, allocate a portion of the logically contiguous section of memory to each of the processors 316, and otherwise perform the memory allocation process that has been described.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Embodiments of the invention may, for instance, be implemented in accordance with the Linux operating systems, as well as other operating systems. It is manifestly intended that this invention be limited only by the claims and equivalents thereof.

We claim:

1. A method comprising:
   mapping a plurality of physically non-contiguous sections of memory into a logically contiguous section of memory;
   for each computing unit of a plurality of computing units, allocating a portion of the logically contiguous section of memory addressable by a pointer plus a static offset corresponding to the computing unit,
      wherein the static offset for each computing unit is equal to a static offset initially determined at initial allocation of memory for the plurality of computing units;
   dynamically passing out the portion of the logically contiguous section of memory to each computing unit of the plurality of computing units as the computing units need additional memory;
   upon the logically contiguous section of memory being completely passed out to the plurality of computing units,
      mapping a second plurality of physically non-contiguous sections of memory into a second logically contiguous section of memory;
      for each computing unit of the plurality of computing units, allocating a portion of the second logically contiguous section of memory addressable by a pointer plus the static offset corresponding to the computing unit; and,
      dynamically passing out the portion of the second logically contiguous section of memory to each computing unit of the plurality of computing units as the computing units need additional memory.

2. The method of claim 1, wherein the portion of the logically contiguous section of memory allocated for each computing unit includes memory local to the computing unit.

3. The method of claim 1, further comprising determining the static offset for each computing unit as equal to the static offset initially determined at the initial allocation of the memory for the plurality of computing units.

4. The method of claim 1, further comprising at the initial allocation of the memory for the plurality of computing units:
   determining the static offset for each computing unit of the plurality of computing units; and,
   for each computing unit of the plurality of computing units, allocating a portion of memory addressable by a pointer plus the static offset corresponding to the computing unit.

5. The method of claim 4, further comprising dynamically passing out the portion of the memory to each computing unit of the plurality of computing units as the computing units need additional memory.

6. The method of claim 1, wherein the computing unit is one of a computing node and a processor.

7. A method comprising:
   determining a static offset for each computing unit of a plurality of computing units;
   for each computing unit of the plurality of computing units, allocating a portion of predetermined memory addressable by a pointer plus the static offset corresponding to the computing unit;
   dynamically passing out the portion of the predetermined memory to each computing unit of the plurality of computing units as the computing units need additional memory;
   upon the predetermined memory being completely passed out to the plurality of computing units,
      mapping a plurality of physically non-contiguous sections of additional memory into a logically contiguous section of memory;
      for each computing unit of the plurality of computing units, allocating a portion of the logically contiguous section of memory addressable by a pointer plus the static offset corresponding to the computing unit, where the portion of the logically contiguous section of memory is local to the computing unit; and,
      dynamically passing out the portion of the logically contiguous section of memory to each computing unit of the plurality of computing units as the computing units need additional memory.

8. The method of claim 7, further comprising, upon the logically contiguous section of memory being completely passed out to the plurality of computing units,
   mapping a second plurality of physically non-contiguous sections of memory into a second logically contiguous section of memory;
   for each computing unit of the plurality of computing units, allocation a portion of the second logically contiguous section of memory addressable by a pointer plus the static offset corresponding to the computing unit, wherein the portion of the second logically contiguous section of memory is local to the computing unit; and,
   dynamically passing out the portion of the second logically contiguous section of memory to each computing unit of the plurality of computing units as the computing units needs additional memory.

9. A system comprising:
   a plurality of computing nodes;
   memory shared by the plurality of computing nodes; and,
   an allocating mechanism to map a plurality of physically non-contiguous sections of memory into a logically contiguous section of memory and to allocate a portion of the logically contiguous section of memory to each computing node,
   wherein the portion of the logically contiguous section of memory is addressable by a pointer plus a static offset corresponding to the computing node and equal to a static offset initially determined for allocating a portion of memory to each computing node and
   wherein the allocating mechanism is further to
      dynamically pass out the portion of the logically contiguous section of memory to each computing node of the plurality of computing units as the computing nodes need additional memory:
      upon the logically contiguous section of memory being completely passed out to the plurality of computing nodes,
         map a second plurality of physically non-contiguous sections of memory into a second logically contiguous section of memory;
         for each computing node of the plurality of computing nodes, allocate a portion of the second logically contiguous section of memory addressable by a pointer plus the static offset corresponding to the computing node; and, dynamically pass out the portion of the second logically contiguous section of memory to each computing node of the plurality of computing units as the computing nodes need additional memory.

10. The system of claim 9, wherein the portion of the logically contiguous section of memory allocated to each computing node includes memory local to the computing node.

11. The system of claim 9, wherein each of the plurality of computing nodes comprises a single processor.

12. The system of claim 9, wherein each of the plurality of computing nodes comprises a plurality of processors.

13. A system comprising:
a plurality of computing nodes;
memory shared by the plurality of computing nodes; and,
means for mapping a plurality of physically non-contiguous sections of memory into a logically contiguous section of memory and for allocating a portion of the logically contiguous section of memory to each computing node,
wherein the portion of the logically contiguous section of memory is addressable by a pointer plus a static offset corresponding to the computing node and equal to a static offset for allocating a portion of memory to each computing node, and
wherein the means is further for
dynamically passing out the portion of the logically contiguous section of memory to each computing node of the plurality of computing units as the computing nodes need additional memory;
upon the logically contiguous section of memory being completely passed out to the plurality of computing nodes,
mapping a second plurality of physically non-contiguous sections of memory into a second logically contiguous section of memory;
for each computing node of the plurality of computing nodes, allocating a portion of the second logically contiguous section of memory addressable by a pointer plus the static offset corresponding to the computing node; and,
dynamically passing out the portion of the second logically contiguous section of memory to each computing node of the plurality of computing units as the computing nodes need additional memory.

14. A computing node comprising:
a plurality of processors;
memory shared by the plurality of processors; and,
an allocating mechanism to map a plurality of physically non-contiguous sections of memory into a logically contiguous section of memory and to allocate a portion of the logically contiguous section of memory to each processor,
wherein the portion of the logically contiguous section of memory is addressable by a pointer plus a static offset corresponding to the processor and equal to a static offset initially determined for allocating a portion of memory to each processor, and
wherein the allocating mechanism is further to
dynamically pass out the portion of the logically contiguous section of memory to each processor of the plurality of computing units as the processors need additional memory;
upon the logically contiguous section of memory being completely passed out to the plurality of processors,
map a second plurality of physically non-contiguous sections of memory into a second logically contiguous section of memory;
for each processor of the plurality of processors, allocate a portion of the second logically contiguous section of memory addressable by a pointer plus the static offset corresponding to the processor; and,
dynamically pass out the portion of the second logically contiguous section of memory to each processor of the plurality of computing units as the processors need additional memory.

15. The computing node of claim 14, wherein the portion of the logically contiguous section of memory allocated to each processor is local to the processor.

16. A computing node comprising:
a plurality of processors;
memory shared by the plurality of processors; and,
means for mapping a plurality of physically non-contiguous sections of memory into a logically contiguous section of memory and for allocating a portion of the logically contiguous section of memory to each processor,
wherein the portion of the logically contiguous section of memory is addressable by a pointer plus a static offset corresponding to the processor and equal to a static offset for allocating a portion of memory to each processor, and
wherein the means is further for
dynamically passing out the portion of the logically contiguous section of memory to each processor of the plurality of computing units as the processors need additional memory;
upon the logically contiguous section of memory being completely passed out to the plurality of processors,
mapping a second plurality of physically non-contiguous sections of memory into a second logically contiguous section of memory;
for each processor of the plurality of processors, allocating a portion of the second logically contiguous section of memory addressable by a pointer plus the static offset corresponding to the processor; and,
dynamically passing out the portion of the second logically contiguous section of memory to each processor of the plurality of computing units as the processors need additional memory.

17. An article of manufacture comprising:
a computer-readable medium; and,
means in the medium for mapping a plurality of physically non-contiguous sections of memory into a logically contiguous section of memory and for allocating a portion of the logically contiguous section of memory to each computing unit of a plurality of computing units,
wherein the portion of the logically contiguous section of memory is addressable by a pointer plus a static offset corresponding to the computing unit and equal to a static offset initially determined at boot time of the plurality of computing units for allocating a portion of memory to each computing unit, and wherein the means is further for
dynamically passing out the portion of the logically contiguous section of memory to each computing unit of the plurality of computing units as the computing units need additional memory;
upon the logically contiguous section of memory being completely passed out to the plurality of computing units,
mapping a second plurality of physically non-contiguous sections of memory into a second logically contiguous section of memory;
for each computing unit of the plurality of computing units, allocating a portion of the second logically contiguous section of memory addressable by a pointer plus the static offset corresponding to the computing unit; and,
dynamically passing out the portion of the second logically contiguous section of memory to each computing unit of the plurality of computing units as the computing units need additional memory.

* * * * *